Feb. 13, 1968   P. J. WEAVER   3,368,583
ROTARY VALVE OPERATOR INCLUDING OPERATING
AND CENTERING PISTON ASSEMBLIES
Filed May 26, 1965   2 Sheets-Sheet 2
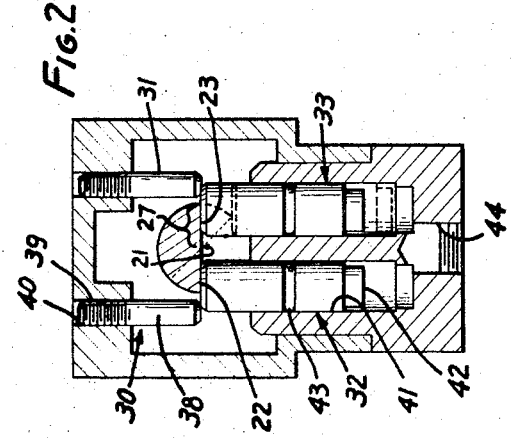
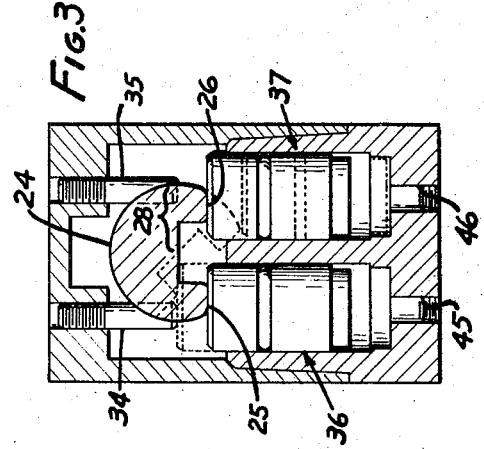
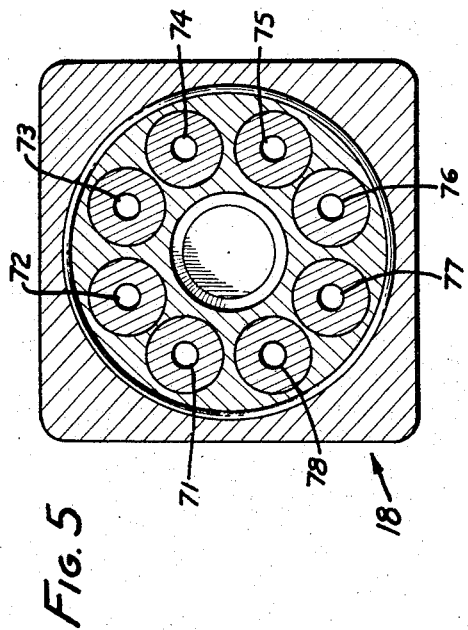
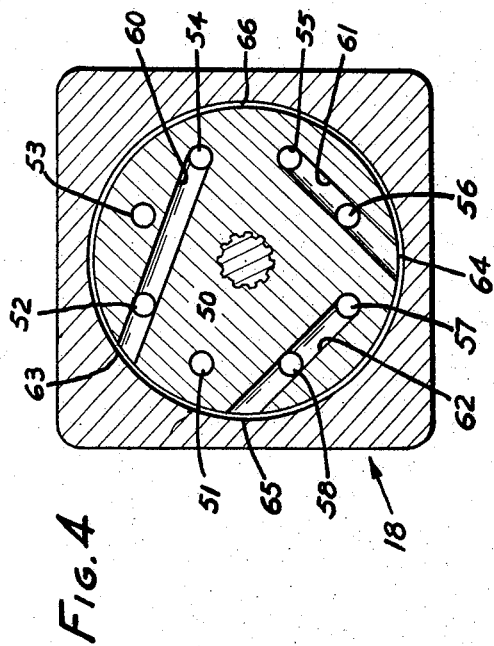
INVENTOR
PAUL J. WEAVER
BY
ATTORNEYS.

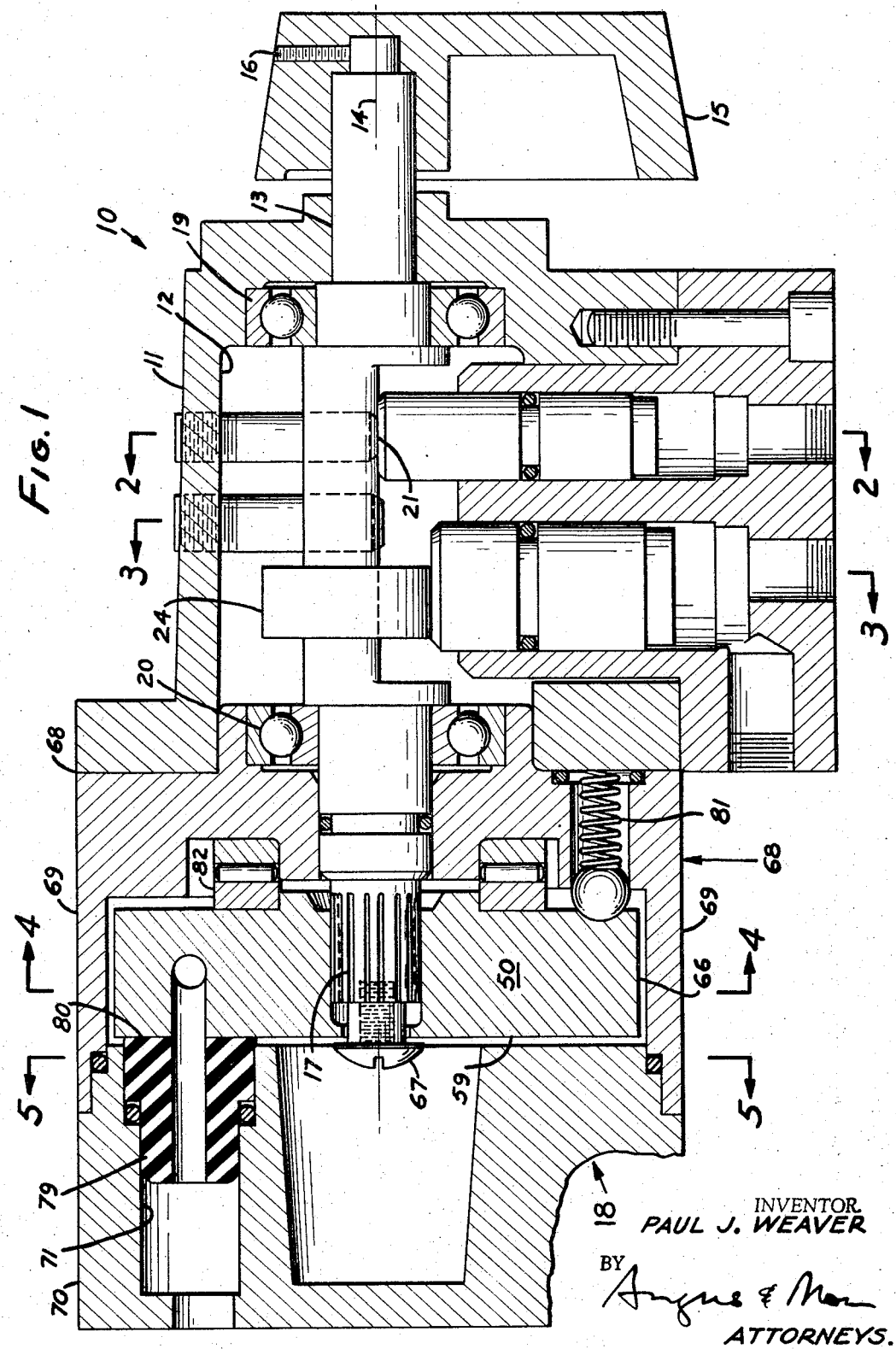

United States Patent Office 3,368,583
Patented Feb. 13, 1968

3,368,583
ROTARY VALVE OPERATOR INCLUDNG OPERATING AND CENTERING PISTON ASSEMBLIES
Paul J. Weaver, Pasadena, Calif., assignor to True-Trace Corporation, El Monte, Calif., a corporation of Connecticut
Filed May 26, 1965, Ser. No. 458,999
6 Claims. (Cl. 137—625.46)

This invention relates to a valve operator and to a valve utilizing said operator.

There is a requirement for a simple valve operator which can be operated either manually or by power controlled remotely, which power may be pressurized hydraulic or pneumatic fluid. Prior art devices having this general objective have ordinarily required the user to overcome resistive forces when operating the valve manually, which resistive forces were needed when the device was to be power-controlled. However, those resistive forces constitute a disadvantage during manual operation. Furthermore, there is a need for a valve operator which, when the device is initially placed under power control, will cause the valve to assume some unique position. In addition, it is desirable for some element visually to indicate the valve setting.

The present invention meets all of the foregoing objectives. It can be manually adjusted by turning a handle which acts as an indicator when the device is power-controlled. It can be power controlled, having a reference position under such circumstances and, when the power is turned off, there are no resistive forces to be overcome when the device is operated manually.

A valve operator according to this invention includes a housing with a shaft rotatable around an axis therein. This shaft has a first and a second pair of reaction surfaces which are radially spaced from the axis by a first or a second distance, respectively. The first and the second pair of force means, piston-cylinder assemblies for example, are oppositely directed against a respective one of the reaction surfaces of a respective pair thereof. A first and a second pair of stop means is provided in the paths of respective ones of the force means so as to prevent the first pair of force means from turning the shaft to an off-central position, the second pair of stop means preventing the second pair of force means from turning the shaft past a respective off-central position.

According to a preferred but optional feature of this invention, the elements of the first pair of force means are coupled to exert simultaneous equal and opposite torques on the shaft due at respective first reaction surfaces, while the elements of the second pair of force means are adapted to exert non-simultaneous forces on the second reaction surfaces to overcome the torque of the opposing forces on the first pair of said reaction surfaces so as selectively to turn the shaft to a first or a second off-central position. The first pair of force means is adapted to center the shaft at its central position when there is no unequal torque exerted on the shaft by the second force means.

According to still another preferred but optional feature of the invention, a shear seal valve is provided, one part of which is connected to the housing and the other part of which is connected to the valve whereby the operator, in assuming one of its positions adjusts the shear seal valve to a respective position.

The above and other features of this invention will be fully understood from the following detailed description and the accompanying drawings, in which:

FIG. 1 is a side elevation, principally in axial cross-section, showing the presently preferred embodiment of the invention; and FIGS. 2–5 are cross-sections taken at lines 2—2, 3—3, 4—4, and 5—5, respectively, in FIG. 1.

In FIG. 1, the presently preferred embodiment of valve operator 10 is shown. This valve operator includes a housing 11 having an internal cavity 12. A shaft 13 has an axis 14. The shaft passes through the cavity and projects from the housing at both ends. A handle 15 is attached to the shaft by means of a set screw 16 at its right-hand end in FIG. 1. The other end of the shaft carries splines 17 for attachment to a portion of a shear seal valve 18 which will be described in full detail below. A pair of bearings 19, 20 mount the shaft for rotation around its axis in the housing.

The shaft is milled so as to provide a flat surface 21 which, as can best be seen in FIG. 2, includes two reaction surfaces 22, 23, these reaction surfaces forming a first pair thereof. In the example shown, they are two parts of a single surface, but it is evident that they could be separated, such as by a groove. A generally U-shaped collar 24 or protrusion is formed on the shaft that carries a second pair of reaction surfaces 25, 26. These are axially spaced from surfaces 22 and 23. The reaction surfaces 22, 23 are spaced by a first distance 27 from the axis and the second pair are spaced by a second distance 28 therefrom, these distances being the respective lever arms. The same force can exert a greater torque on the shaft through the second pair of reaction surfaces than through the first.

As can best be seen in FIGS. 2 and 3, a first pair of stop means 30, 31 is provided adjacent to the shaft projecting into the housing and obstructively aligned with a first pair of force means 32, 33.

Likewise in FIG. 3 a second pair of stop means 34, 35 is illustrated, obstructively aligned with a second pair of force means 36, 37. Stop means 30 is characteristic of all of them. It includes a shank 38 with a thread 39 adapted to thread into a port 40 in the housing. The axial position of the stop means can be adjusted by turning the shank. Slots (not shown) could be provided on the shank for this purpose.

The preferred alignment of force means and stop means is as shown in FIGS. 2 and 3. In this arrangement, the free ends of the stop means are aligned with each other in a plane which includes the axis of the shaft.

Force means 32 is characteristic of all the force means. It includes a cylinder 41, a piston 42, and a sliding seal 43 making a fluid-tight sliding fit between the piston and the wall of the cylinder.

The cylinders of both elements of the first pair of force means are connected to a single port 44 and are thereby adapted to be coupled for simultaneous pressurization from the same source. Contrariwise, the cylinders of the second force means are individually connected to ports 45, 46 so that they may be powered individually instead of simultaneously. Any form of fluid under pressure may be used.

It will be noted that the area of the cylinders in the second force means 36, 37 is greater than the cross-sectional area of the pistons in the first force means whereby if an equal pressure were exerted in the first and one of the second force means, the first force means would be overpowered. This effect is also accentuated by the larger lever arm of the second reaction surfaces, when this feature is provided.

The shaft has a first central position shown in solid line in FIGS. 2 and 3. Alternatively it has a pair of off-central positions, one of which is shown in dotted line in each of FIGS. 2 and 3. The other off-central position would be an equal angular rotation from the central position, but in the opposite direction from that shown in FIG. 3.

It will be observed in FIG. 2 that, assuming no differential pressure to be exerted by the second force means, the effect of the first force means will be to center the shaft to the central position shown in solid line. With the force means abutting the first stop means. The first force means are prevented from moving the shaft to either off-central position by the first stop means. However, when the second stop means are powered, such as by placing an elevated pressure on the same order of magnitude as that in port 44 on force means 36, for example, then force means 33 will be overcome and moved to its dotted line position. Port 46 is vented so that the piston of force means 37 can move to the illustrated dotted-line position. Piston 42 is stopped by stop means 30 while the piston in force means 36 is not stopped until it has travel to the dotted-line position which is enough that the shaft assumes its off-central position. At that time stop means 34 stops further motion. Motion in the opposite sense is provided by pressurizing port 46 and venting port 45.

It will be noted that the effect of first force means 32, 33 is to center the shaft, and that this centering power is overcome by a greater torque than is exerted by either of the force means. Therefore, it is now possible to make, for example, a four-way valve under control of this operator, wherein the selection is higher pressure in port 45, higher pressure in port 46, or no differential between ports 45 and 46. This provides for three unique valve and operator positions. These positions can be caused by manual actuation as well.

Shear seal valve 18 includes a seal plate 50. A plurality of ports 51-58 open onto a face 59 thereof (see FIGS. 1 and 4). A channel 60 interconnects ports 52 and 54; a channel 61 interconnects ports 55 and 56; and a channel 62 interconnects ports 57 and 58. Channels 60, 61, 62 have openings 63, 64, 65 at the peripheral surface 66 of the seal plate. Plate 50 is held to spline 17 by screw 67.

Valve housing 68 includes two portions 69, 70. The plate fits in portion 69. Through portion 70 there pass eight ports 71-78 (see FIG. 5). These ports have fitted within them seal members 79, a typical example being shown in port 71 in FIG. 1. This includes an upper seal surface 80 which abuts face 59 of the seal plate. By appropriate rotation of the seal plate among its various positions, different combinations of ports in the plate will be lined up with individual ports in housing portion 70. This provides for selective valving means of any desired type, the example shown being a four-way valve wherein reversal of flow or no flow may be achieved.

The use of the foregoing should be evident from the drawings. It will be obvious that the operation may be made without using fluid power by relieving all of ports 44-46 from elevated fluid pressure. Then the shaft may simply be turned by handle 15 without having to overcome any of the resistance fluid force.

A ball detent 81 is provided to steady the seal plate at selected positions, there being a dimple in the plate to receive the ball. A roller bearing 82 eases the rotation of the plate relative to the housing.

It will be seen from the foregoing that this is a simple valve operator which can be utilized with a wide range of valves, the preferred example of valve being a shear seal type. This valve operator merely requires torque on the second force means sufficient to overcome the resistance in the first force means when provided, or a sufficient force on the handle to do the same.

This invention is not to be limited by the embodiment shown in the drawings and described in the description which is given by way of example and not of limitation, but only in accordance with the scope of the appended claims.

I claim:

1. A valve operator for selecting a valve position, comprising: a housing; a shaft rotatable around an axis in said housing, said shaft having a first and a second pair of reaction surfaces the members of the first pair and of the second pair of said reaction surfaces being radially spaced from said axis by a first and a second distance, respectively; a first and a second pair of force means, comprising a piston-cylinder assembly, the two assemblies of the first pair being adapted simultaneously to be joined to a common source of power, the two assemblies of the second pair being adapted selectively and individually to be connected to a source of power, the cross-sections exposed to power of the assemblies of the second pair of force means being greater than those of the first pair, each said pair of force means including two elements, the elements of each of said last-named pairs being oppositely directed against a respective one of the reaction surfaces of a respective pair thereof; a first and a second pair of stop means, each pair of stop means comprising a stop member respective to one of said elements and obstructively in the path of movement thereof, the elements of the first pair of force means being coupled to produce simultaneous equal and opposite torques on the shaft through the respective first pair of reaction surfaces, the elements of the second pair of force means being adapted to exert non-simultaneous forces on the reaction surfaces of the second pair of a magnitude to overcome the torque of the opposing forces on the first pair of said reaction surfaces so as selectively to turn the shaft to a first or a second off-central position and, when the forces are equal on the elements of the second pair of force means, to enable the first pair of force means to turn the shaft to a central position, the first pair of stop means preventing the first pair of force means from turning the shaft to an off-central position, and the second pair of stop means preventing the second pair of force means from turning the shaft past respective off-central positions.

2. A valve operator according to claim 1 in which the second distance is greater than the first distance.

3. A valve operator according to claim 1 in which the members of the first and the second stop means terminate on a plane common to them and inclusive of the axis.

4. In combination: a valve having a plurality of rotational settings derived by relatively rotatably two parts thereof; and a valve operator for selecting among said settings comprising: a housing connected to one of said parts; a shaft connected to the other of said parts, said shaft being rotatable around an axis in said housing, said shaft having a first and a second pair of reaction surfaces the members of the first pair and of the second pair of said reaction surfaces being radially spaced from said axis by a first and a second distance, respectively; a first and a second pair of force means, comprising a piston-cylinder assembly, the two assemblies of the first pair being adapted simultaneously to be joined to a common source of power, the two assemblies of the second pair being adapted selectively and individually to be connected to a source of power, the cross-sections exposed to power of the assemblies of the second pair of force means being greater than those of the first pair, each said pair of force means including two elements, the elements of each of said last-named pairs being oppositely directed against a respective one of the reaction surfaces of a respective pair thereof; a first and a second pair of stop means, each pair of stop means comprising a stop member respective to one of said elements and obstructively in the path of movement thereof, the elements of the first pair of force means being coupled to produce simultaneous equal and opposite torques on the shaft through the respective first pair of reaction surfaces, the elements of the second pair of force means being adapted to exert non-simultaneous forces on the reaction surfaces of the second pair of a magnitude to overcome the torque of the opposing forces on the first pair of said reaction surfaces so as to selectively turn the shaft to a first or a second off-central position and, when the forces are equal on the elements of the second pair of force means, to enable the first pair of force means to turn the shaft to a central position, the first pair of stop means preventing the first pair of force means from turning the shaft to an off-central position, and the second pair of stop means preventing the second pair of force means from turning the shaft past respective off-central positions.

5. A combination according to claim 4 in which the second distance is greater than the first distance.

6. A combination according to claim 8 in which the members of the first and the second stop means terminate on a plane common to them and inclusive of the axis.

References Cited

UNITED STATES PATENTS

| 810,108 | 1/1906 | Conrader | 251—58 |
| 1,139,221 | 5/1915 | Potter | 251—58 X |
| 3,056,593 | 10/1962 | Matheson et an. | 251—58 X |

M. CARY NELSON, *Primary Examiner.*

ARNOLD ROSENTHAL, *Examiner.*

UNITED STATES PATENT OFFICE
CERTIFICATE OF CORRECTION

Patent No. 3,368,583                 February 13, 1968

Paul J. Weaver

It is hereby certified that error appears in the above numbered patent requiring correction and that the said Letters Patent should read as corrected below.

Column 3, line 2, for ". With" read -- , with --; line 14, for "travel" read -- traveled --; line 55, strike out "of the"; column 5, line 12, for the claim reference numeral "8" read -- 4 --.

Signed and sealed this 29th day of April 1969.

(SEAL)
Attest:

Edward M. Fletcher, Jr.
Attesting Officer

EDWARD J. BRENNER
Commissioner of Patents